United States Patent [19]

Rousseau

[11] 4,433,816
[45] Feb. 28, 1984

[54] WIRE GUIDE AND RETAINER ASSEMBLY

[75] Inventor: Kenneth E. Rousseau, Wichita, Kans.

[73] Assignee: Harper Trucks, Inc., Wichita, Kans.

[21] Appl. No.: 367,170

[22] Filed: Apr. 12, 1982

[51] Int. Cl.³ .................... B65H 49/00; B65H 17/20
[52] U.S. Cl. ............................ 242/129.62; 226/189;
226/190; 242/157 R
[58] Field of Search ................ 242/128, 129.5, 129.53,
242/129.6, 129.62, 129.72, 130, 157 R, 157.1,
54 R, 171; 226/189, 190, 192, 194; 57/58.83, 59

[56] References Cited

U.S. PATENT DOCUMENTS

| 3,081,957 | 3/1963 | Van de Bilt | 242/54 R |
| 3,137,452 | 6/1964 | Winders | 242/54 R |
| 3,248,088 | 4/1966 | Benson et al. | 242/157.1 |
| 3,717,313 | 2/1973 | Williams | 242/54 R |
| 3,963,191 | 6/1976 | Goodley | 242/75.43 |
| 4,320,619 | 3/1982 | Allard | 57/59 |

FOREIGN PATENT DOCUMENTS 819966 10/1937 France .................. 242/105

Primary Examiner—Leonard D. Christian

Attorney, Agent, or Firm—Phillip A. Rein

[57] ABSTRACT

The wire guide and retainer assembly of this invention is utilized with a wire dispenser stand assembly to dispense a wire strand member from the reel members mounted on a support assembly. The wire guide and retainer assembly includes (1) a first wire guide assembly; and (2) a second wire guide assembly. The first wire guide assembly includes a first frame support assembly secured to the support assembly; and a first pulley assembly mounted on said first frame support assembly. The first frame support assembly includes a pair of support arms having one end pivotally connected to the support assembly and a support shaft mounted between the support arms. The first pulley assembly is rotatably mounted on the support shaft and axially movable thereon. The second wire guide assembly is substantially identical to the first wire assembly with a second pulley assembly mounted on a support shaft member. The first pulley assembly and the second pulley assembly are both rotatable and axially movable on their respective support shafts to properly remove the wire strand member from the reel member while maintaining the proper tension thereon.

10 Claims, 7 Drawing Figures

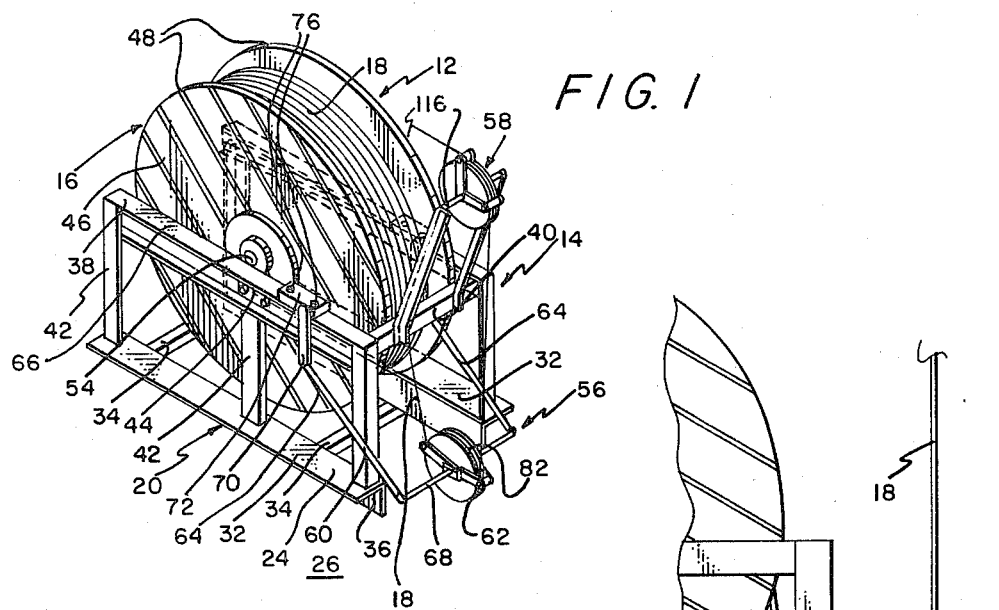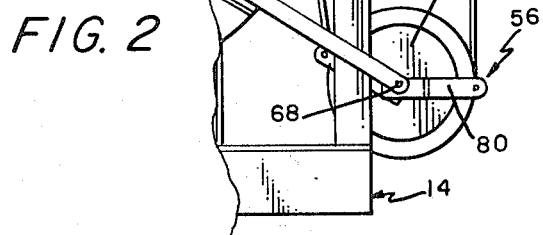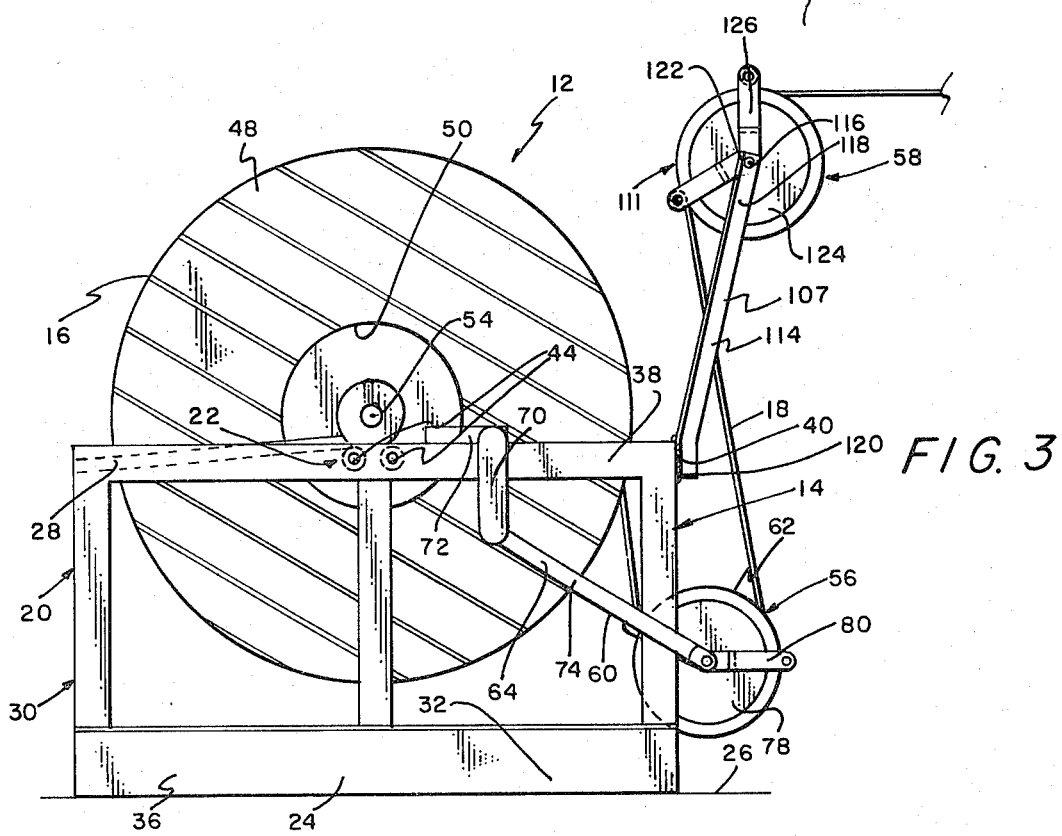

WIRE GUIDE AND RETAINER ASSEMBLY

PRIOR ART

As a patentability investigation was not conducted on this invention, the applicant herein is not aware of any pertinent United States or foreign patent references.

PREFERRED EMBODIMENT OF THE INVENTION

The wire guide and retainer assembly of this invention is utilized with a wire dispenser stand assembly in order to properly dispense large reels holding welding wire thereon. The wire guide and retainer assembly operates to properly control the feed of the welding wire from the welding wire reel to an automatic welding machine. The wire dispenser stand assembly is of a substantially conventional nature having means for rolling the large welding wire reels thereupon to elevate off the floor and allow the same to be rotated while mounted on rotatable cam bearings. The wire dispenser stand assembly includes a basic support frame assembly and a reel support assembly to rotatably receive the welding wire reel thereupon. The wire guide and retainer assembly is secured to the basic support frame assembly and includes (1) a first wire guide assembly; and (2) a second wire guide assembly. The first wire guide assembly includes a first frame support assembly secured to the basic support frame assembly; and a first pulley assembly mounted on said first frame support assembly. The first frame support assembly includes a pair of elongated parallel support arms having one end pivotally connected to the basic support frame assembly and a support shaft mounted between the support arms. The first pulley assembly includes a first pulley member rotatably mounted upon the support shaft and a first retainer assembly mounted upon the support shaft and associated with the first pulley member. The first pulley member is of a conventional nature having an outer groove to receive the welding wire therein and a central bearing assembly so as to be rotatable mounted on the support shaft plus being able to freely move laterally thereon. The first retainer assembly includes a pair of identical spaced retainer arms centrally interconnected by a support bearing and having outer ends of the retainer arms interconnected by wire roller assemblies. The retainer arms are each constructed of a pair of welded arm members positioned at an angle preferrably 150 degrees relative to each other. The support bearing is adapted to receive the first pulley member thereupon and allows for conjoint axial movement of the first pulley member and the first retainer assembly upon the support shaft. The outer ends of each arm member is provided with a hole therein adapted to receive a wire roller assembly therein. Each wire roller assembly includes a roller member mounted upon a nut and bolt member which interconnected the same. The second wire guide assembly is substantially identical to the first wire guide assembly having a second frame support assembly secured to the basic support frame assembly; and a second pulley assembly connected to the second frame support assembly. The second frame support assembly includes a pair of parallel spaced support members having one end secured to the basic support frame assembly and the outer ends thereof interconnected by a support shaft member. The second pulley assembly includes a second pulley member rotatably mounted on the support shaft member and a second retainer assembly mounted about the second pulley member and additionally rotatably mounted on the support shaft member. The second pulley member and the second retainer assembly are substantially identical to the counterparts above described for the first pulley member and the first retainer assembly. The novelty of the invention can best be understood when one realizes that the welding wire from the welding wire reel member is first trained (1) through a space between the first pulley member and a wire roller assembly on the first retainer assembly; (2) within the groove in the first pulley member; and (3) through a second wire roller assembly on the first retainer assembly. This can be used as a single unit thereupon training the welding wire off the reel, about the first pulley member, and into a verticle line upwardly. The feature of the first retainer assembly assures holding the welding wire properly upon the first pulley member while allowing the entire first pulley assembly to move axially upon the support shaft to assure proper training of the welding wire and removal from the large welding wire reel member. Also, the pivotal attachment of the support arms allows for the joint structure of the support shaft and first pulley assembly to pivot upwardly so as to take up any slack in the welding wire to prevent breakage thereof and assure proper feeding characteristics. The second wire guide assembly is utilized when it is desired to train or take the wire from the first wire guide assembly and train the same in a horizontal direction, either frontwards or backwards to an automatic welding wire machine. The welding wire is trained from the first wire guide assembly to one side or the other of the second pulley member between the groove thereon and the roller member of the wire roller assembly. The welding wire is trained further about the second pulley member and between the other roller member of the wire roller assembly for movement in a horizontal direction. It is noted that the second pulley assembly is also movable laterally on the support shaft member so as to keep up with the movement of the first pulley assembly as it receives and guides the welding wire from the large welding wire reel member. The first and second retainer assemblies are rotatable on their respective support shaft and support shaft member which also provides an important feature in taking up any slack in the welding wire.

OBJECTS OF THE INVENTION

One object of this invention is to provide a wire guide and retainer assembly which can be readily attached to existing welding wire dispenser stand assemblies in order to receive and control the feeding of the welding wire from a welding wire reel member to an automatic welding wire welding machine.

One other object of this invention is to provide a wire guide and retainer assembly adapted to receive welding wire from a rotating welding wire reel member and maintain the desired and proper tensioning on the welding wire to prevent the formation of slack therein with its potential for breakage.

One further object of this invention is to provide a wire guide and retainer assembly having a first wire guide assembly to receive the welding wire from a welding wire reel member and a second wire guide assembly to subsequently receive the welding wire for proper movement thereof in opposite directions in a horizontal plane.

One further object of this invention is to provide a wire guide and retainer assembly attachable to any existing welding wire dispenser stand assembly which achieves complete, accurate movement of the welding wire to an automatic welding machine structure being obtainable with a minimum amount of moving parts.

One other object of this invention is to provide a wire guide and retainer assembly which is operable to remove welding wire from large bulk welding wire reel members and automatically removing any slack in the welding wire during its efficient removal.

Still, one further object of this invention is to provide a wire guide and retainer assembly which is readily attached to existing welding wire dispenser stands assemblies which is economical to manufacture; simple to install; easy to use; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a perspective view of the wire guide and retainer assembly of this invention as mounted on a wire dispenser stand assembly and having a welding wire reel member mounted thereon;

FIG. 2 is a fragmentary side elevational view of the structure as shown in FIG. 1;

FIG. 3 is a side elevational view of the structure as shown in FIG. 1 except having the welding wire being moved in an opposite horizontal direction;

Figure 4:
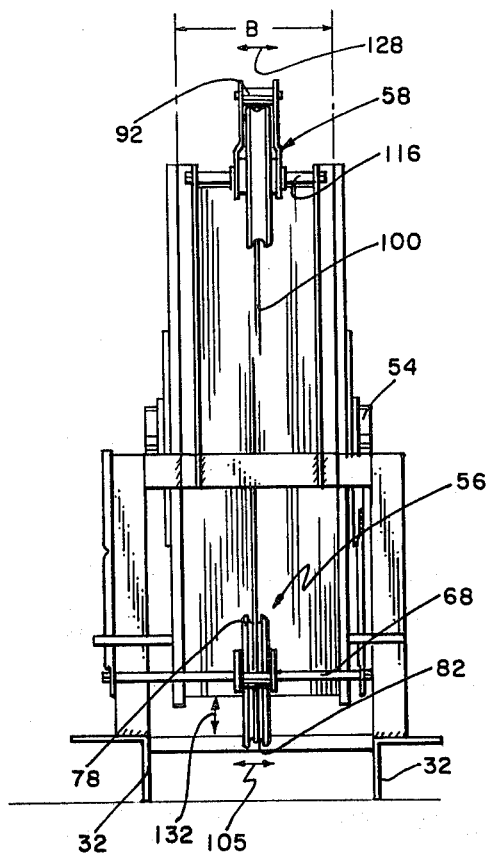
FIG. 4 is a front elevational view of the structure as shown in FIG. 1.

The following is a discussion and description of preferred specific embodiments of the wire guide and retainer assembly of this invention, such being made with reference to the drawings, whereupon the same reference numerals are used to indicate the same or similar parts and/or structure. It is to be understood that such discussion and description is not to unduly limit the scope of this invention.

DESCRIPTION OF THE INVENTION

As shown in FIG. 1, a wire guide and retainer assembly of this invention indicated generally at 12, is shown as attached to a wire dispenser stand assembly 14 having a welding wire reel member 16 rotatably mounted thereon and welding wire 18 being dispensed from the reel member 16. It should be understood that the wire guide and retainer assembly 12 of this invention can be secured and utilized with various types of wire dispenser stand assemblies 14.

The wire dispenser stand assembly 14 includes a (1) basic support frame assembly 20; and (2) a reel support assembly 22 mounted thereon. The basic support frame assembly 20 includes a lower frame assembly 24 mounted upon a support surface 26; an upper frame assembly 28; and a vertical support assembly 30 interconnecting the lower frame assembly 24 to the upper frame assembly 28. The lower frame assembly 24 includes a pair of parallel support members 32 interconnected by lateral support members 34. The parallel support members 32 are shown as constructed of heavy angle iron material being supported upon a vertical leg 36 which permits a forklift truck to readily move same.

The upper frame assembly 28 includes a pair of spaced parallel reel support members 38 interconnected at one end by a forward support member 40. The reel support members 38 may be constructed of a heavy steel material being of U-shaped in transverse cross section. The vertical support assembly 30 include a plurality, namely six, vertical support members 42. The support members 42 are preferably of a rectangular tube structure to provide substantial vertical support.

The reel support assembly 22 includes a pair of adjacent cam bearing members 44 secured to each one of the parallel reel support members 38. The cam bearing members 44 operate to receive a portion of the welding wire reel member 16 thereupon in a manner to be explained.

As noted in FIG. 1, the welding wire reel member 16 includes a wooden wire pulley or reel member 46 having opposed vertically extended end walls 48 interconnected by a central tube 50. It is obvious that the welding wire 18 comes in various sizes mounted about the central shaft or tube 50 between the end walls 48. A special wire reel mandral is inserted through the central tube 50 on the reel member 16 and having an outer shield member with a central shaft portion 54. This shaft portion 54 supports the entire reel member 16 and is adapted to rest upon the cam bearing members 44. The reel member 16, now elevated above the support surface 26, is easily rotatable as the welding wire 18 is pulled therefrom through the wire guide and retainer assembly 12 of this invention.

The wire guide and retainer assembly 12 includes (1) a first wire guide assembly 56 pivotally connected at one end to the spaced parallel reel support members 38; and (2) a second wire guide assembly 58 secured to the forward support member 40 of the upper frame assembly 28.

The first wire guide assembly 56 includes a first frame support assembly 60 connected to the upper frame assembly 28; and a first pulley assembly 62 rotatably connected to the first frame support assembly 60.

The first frame support assembly 60 includes a pair of spaced parallel support arms 64 having one end pivotally connected to an upper surface 66 of the reel support members 38 and the other outer ends are interconnected by a support shaft 68. The support arms 64 are each provided with a first portion 70 having one end pivotally connected through a connector block 72 to the respective reel support members 38 and a second portion 74 extended outwardly and laterally from the first portion 70. The connector block 72 maybe secured as by bolt members 76 to the upper surface 66 of the respective ones of the reel support members 38. (FIG. 1) The pivotal connection of the first portion 70 can be achieved by numerous means such as a shaft resting on bearings, etc.

The first pulley assembly 62 includes a first pulley member 78 rotatably mounted upon the support shaft 68 and a first retainer assembly 80 which is mounted about the first pulley member 78 and the support shaft 68.

Figure 5:
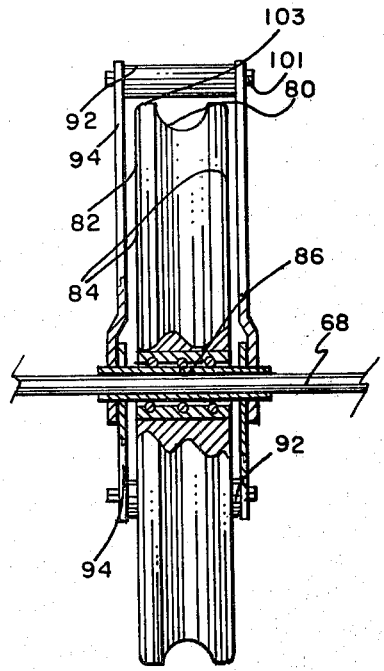
FIG. 5 is a fragmentary view of a first wire guide assembly of the wire guide and retainer assembly of this invention with portions thereof broken away for clarity.

The first pulley member 78, as best shown in FIG. 5, is of a substantially conventional nature having a wire receiving groove 82 formed between two outer side walls 84 with a central hole 86 therein to receive a bearing member if desired for rotatably mounting upon the support shaft 18. The wire receiving groove 82 can be of various sizes in order to receive and retain the welding wire 18 therein in a manner to be explained.

Figure 6:
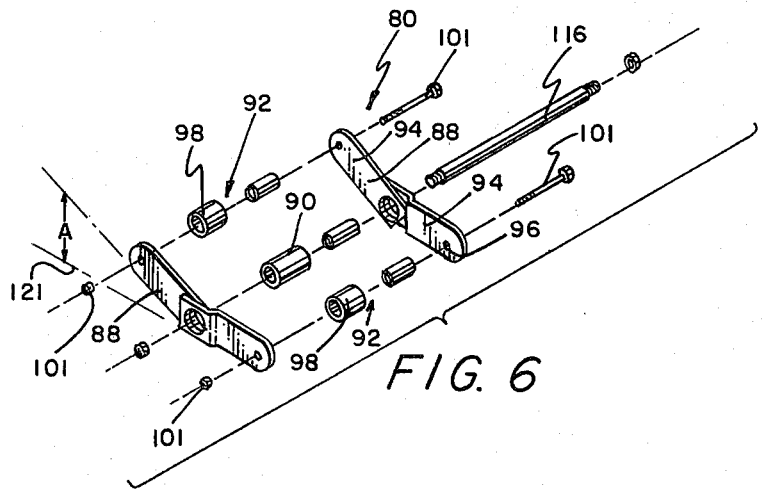
FIG. 6 is an exploded perspective of a first pulley assembly of the wire guide and retainer assembly of this invention; and, FIG. 7 is a schematic diagram illustrating the functions and operations of the wire guide and retainer assembly of this invention as utilized with the wire dispenser stand assembly in unloading welding wire from a welding wire reel member.
Figure 7:
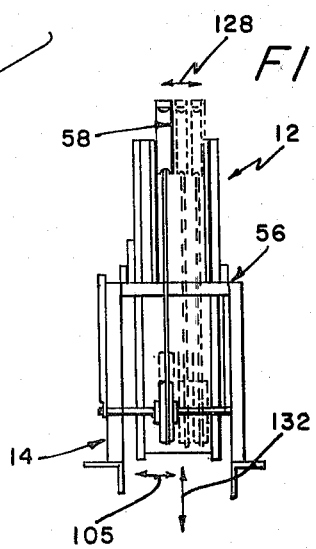

As best shown in FIG. 6, the first retainer assembly 80 includes a pair of spaced retainer arms 88 centrally connected to a support bearing 90 and having wire roller assemblies 92 connected to each outer ends of the respective retainer arms 88. Each retainer arm 88 is constructed of two interconnected arm members 94 which are positioned at an angle preferrably 30 degrees as shown by the letter "A" in FIG. 6. The outer ends of each arm member 94 is formed with a hole 96 therein in order to receive the wire roller assemblies 92 therein. Each wire roller assembly 92 includes a roller member 98 mounted between the arm members 94 and secured thereto by a nut and bolt member 101. As noted in FIG. 6, the respective roller members 98 are positioned adjacent an outer edge 103 of the side walls 84 of the first pulley member 78. This is an important feature to assure that the welding wire 18 is always retained within the groove 82 of the first pulley member 78 and will not be dislodged therefrom.

It is also noted that the interconnection of the first pulley member 78 and the first retainer assembly 80 is such that they move conjointly axially relative to the support shaft 68 as indicated by an arrow 105. This is an important feature as it is noted that the width of the reel member 16 indicated by letter "B" is substantially greater than the width of the first pulley member 78. The first pulley member 78 is free to move on the support shaft 68 as indicated by the arrow 105 which is important in unloading the welding wire 18 from the large reel member 16.

The second wire guide assembly 28 is substantially identical to the above described first wire guide assembly 56. The second wire guide assembly 56 includes a second frame support assembly 107 connected to forward support members 109; and a second pulley assembly 111 connected to the second frame support assembly 107. The second frame support assembly 107 includes a pair of vertically extended support members 114 having a support shaft member 116 connected to outer end portions 118 thereof. The lower ends of the support members 114 are secured as by welding or bolts to a front wall portion 120 of the forward support member 40.

The support members 114 can be constructed of angle iron material or the like having holes 122 in the outer ends thereof to which is attached opposite ends of the support shaft member 116. The second pulley assembly 111 includes a second pulley member 124 rotatably mounted upon the support shaft member 116 and a second retainer assembly 126 mounted about the second pulley member 124 and connected to the support shaft member 116 movement for lateral movement thereon is indicated by an arrow 128. The second pulley member 124 and the second retainer assembly 126 are substantially identical as the respective first pulley member 78 and the first retainer assembly 80 as previously described and further discussion thereof is not deemed necessary.

USE AND OPERATION OF THE INVENTION

When referring to FIG. 1, it is seen that the wire dispenser stand assembly 14 is shown with the wire guide and retainer assembly 12 secured thereto. The wire reel mandral is connected to a full drum of a reel member 16 having the welding wire 18 mounted thereon. In normal cases, the welding wire reel member 16 may be from twenty-three to thirty inches in diameter and with a twelve inch width of welding wire 18 thereon. The reel member 16 with the wire mandral member thereupon is normally rolled through the rear portion of the basic support frame assembly 20 and moved forwardly until the same has become elevated above the support surface 26 and the shaft portions 54 are supported on the respective sides by the cam bearing members 44. It is noted that the reel member 16 is rotated in a clockwise direction as viewed in FIG. 1 whereupon the end of the welding wire 18 is trained downwardly to the first pulley member 78 and put between same and the roller member 98 of the inner wire roller assembly 92. Next, the welding wire 18 is trained around the first pulley member 78 and between same and the roller member 98 of the outward wire roller assembly 92.

In this condition and without the use of the second wire guide assembly 58, the free end of the welding wire 18 can be trained straight upwardly to be fed into automatic welding wire machine for use thereby. It is seen that the pivotal connectors of the first frame support assembly 60 allows the support arms 64 and the interconnected support shaft 68 to move vertically or pivotally as shown by an arrow 132. In the adjusted position, the weight of the first frame support assembly 60 with the first pulley assembly 62 connected thereto operate to take up any slack in the welding wire 18. Additionally, it is seen that the first retainer assembly 80 acts to properly direct the welding wire 18 to the first pulley member 78 and prevent same from moving laterally or becoming dislodged therefrom. Additionally, the first retainer assembly 80 is movable axially upon its support shaft 68, as shown by the arrow 105. This allows for the proper unraveling of the welding wire 18 from the reel member 16 as it moves laterally over the approximately twelve inch width of welding wire 18 held on the reel member 16.

Next, it is obvious that the welding guide and retainer assembly 12 can also may be used with the second wire guide assembly 58 in order to dispense welding wire 18 from the reel member 16 as shown in FIG. 1 or in a forward manner as shown in FIG. 3, both being in a common horizontal plane.

If the welding wire 18 is fed rearwardly as shown in FIG. 1, it is noted that the welding wire 18 is trained from the first pulley member 78 upwardly and placed about the second pulley member 124 and trained thereto between the lowermost one of the wire roller assembly 92. Furthermore, the welding wire 18 is then trained against and within the outer groove 82 of the second pulley member 124 and between same and the upper most of the wire roller assembly 92. It is seen that the pivotal connection of the second retainer assembly 126 by gravity takes up the slack in the welding wire 18 in conjunction with its usage with the first wire guide assembly 56.

As noted in FIG. 3, the welding wire 18 can be trained from the first pulley member 78 to a back side of the second pulley member 124 between the rearward wire roller assembly 92 within the groove 82; against the second pulley member 124; and then between the upper wire roller assembly 92 and the second pulley member 124 to be directed in a forward direction as shown in FIG. 3. As shown in FIG. 3, it is obvious that the gravity will force the second retainer assembly 128 to move downwardly against the welding wire 18 which also acts to take up slack therein in conjunction with the first wire guide assembly 56.

Additionally, it is obvious that the second wire guide assembly 58 and, more particularly, the second pulley assembly 111 is movable laterally on the support shaft member 116 so as to stay in alignment with the first pulley member 78 and its movement upon its respective support shaft 68.

It is seen that the wire guide and retainer assembly of this invention is readily connectable to numerous types of wire dispensers stand assemblies in order to unload welding wire from a reel member. The wire guide and retainer assembly is easy to connect to existing wire dispenser stand assemblies; simple in operation, requires no power source except for pulling of the welding wire by an automatic welding wire machine; is economical to manufacture; and, substantially maintenance free. The wire guide and retainer assembly is self-adjusting to the positioning of the welding wire on the reel member as it is being trained therefrom and has dual features for automatically taking up the slack in the welding wire which is important in its operation on being fed into an automatic welding wire machine. Also, it is noted that the wire guide and retainer assembly requires very little external force in order to remove the welding wire from the reel member and, therefore, should create little problems in maintenance and operation.

While the invention has been described in conjunction with preferred specific embodiments thereof, it will be understood that this description is intended to illustrate and not to limit the scope of the invention, which is defined by the following claims.

I claim:

1. A wire guide and retainer assembly adapted to receive and direct a wire type strand member from a rotatable spool member; comprising:
   (a) a support assembly;
   (b) a first wire guide assembly having a first frame support assembly with one end connected to said support assembly and a first pulley assembly connected to said first frame support assembly;
   (c) said first frame support assembly having support arms with one end pivotally connected to said support assembly and a support shaft connected between outer ends of said support arms;
   (d) said first pulley assembly including a first pulley member mounted on said support shaft and a first retainer assembly connected to said first pulley member and pivotally mounted on said support shaft; and
   (e) said first pulley member and said first retainer assembly both rotatably mounted on and freely movable axially of said support shaft;
   whereby the wire strand member is trained between said first retainer assembly and about said first pulley member and extended in a vertical direction and said first pulley assembly is movable laterally on said support shaft to conform with the position of the wire strand being removed from the spool member.

2. A wire guide and retainer assembly as described in claim 1, wherein:
   (a) said first retainer assembly having retainer arms positioned adjacent said first pulley member with outer ends interconnected by wire roller assemblies;
   whereby, the wire strand member is first trained between one of said wire roller assembly and about said first pulley member, and secondly trained between another one of said wire roller assembly and said first pulley member and extended in the vertical direction whereby the weight of the said support shaft and said first pulley assembly operates to maintain tension on the wire strand member.

3. A wire guide and retainer assembly as described in claim 2 including, a support bearing
   (a) said retainer arms having a pair of opposed parallel arm member portions interconnected at a central portion by said support bearing which, in turn, has said first pulley member rotatably mounted thereon; and
   (b) said arm member portions having an angle of approximately 150 degrees therebetween so as to properly retain the wire strand member against said first pulley members.

4. A wire guide and retainer assembly as described in claim 1, including:
   (a) a second wire guide assembly having a second frame support assembly secured to said support assembly and a second pulley assembly mounted upon said second frame support assembly;
   (b) said second frame support assembly having spaced support members secured at a lower end to said support assembly and interconnected at an upper end to a support shaft member;
   whereby the wire strand member from said first pulley assembly is trained about a portion of said second pulley assembly for movement in a horizontal direction.

5. A wire guide and retainer assembly as described in claim 4, wherein:
   (a) said second pulley assembly has a second pulley member rotatable upon said support shaft member and a second retainer assembly mounted about said second pulley member and on said support shaft member;
   whereby said wire strand member is trained from said first retainer assembly upwardly and about and against said second pulley member to maintain proper tension upon the strand member.

6. A wire guide and retainer assembly as described in claim 4, wherein:
   (a) said second pulley assembly having a second pulley member rotatably mounted on and movable laterally of said support shaft member;
   whereby said first pulley member is maintained aligned with said second pulley member during removal of the wire strand member from the spool member.

7. A wire guide and retainer assembly as described in claim 5, wherein:
   (a) said second retainer assembly includes a pair of retainer arms having arm member portions with a central portion connected to said support bearing which, in turn, is rotatably mounted on said support shaft member; and (b) said second retainer assembly having wire roller assemblies interconnecting adjacent outer ends of said arm member portions.

8. A wire guide and retainer assembly as described in claim 5, wherein:

(a) said second retainer assembly can be rotated substantially 180 degrees on said support shaft member so that the wire strand member can be directed in opposite direction substantially in a common horizontal plane.

9. A wire guide and retainer assembly as described in claim 2, wherein:

(a) said retainer arms are of arcuate shape operable to maintain the wire strand member against said first pulley member and alter direction of movement of said wire strand member substantially 90 degrees.

10. A wire guide and retainer assembly as described in claim 7, wherein:

(a) said arm member portions extended at an angle of approximately 150 degrees relative to each other and having the wire strand member extended between said wire roller assemblies and against said second pulley member.

* * * * *